United States Patent [19]

Barnett

[11] 4,253,681
[45] Mar. 3, 1981

[54] PASSIVE SEAT BELT SYSTEM

[75] Inventor: Ronald R. Barnett, Rochester, Mich.

[73] Assignee: General Motors Corporation, Detroit, Mich.

[21] Appl. No.: 41,013

[22] Filed: May 21, 1979

[51] Int. Cl.³ .................................................. B60R 21/10
[52] U.S. Cl. ........................................ 280/804; 280/808
[58] Field of Search ...................... 280/802, 804, 808; 297/469, 475, 479, 483

[56] References Cited

U.S. PATENT DOCUMENTS

| 3,822,760 | 7/1974 | Lindblad | 280/804 |
| 3,827,713 | 8/1974 | Sakurai et al. | 280/803 |
| 3,831,974 | 8/1974 | Keppel | 280/804 |
| 3,866,975 | 2/1975 | Fricko | 297/479 |
| 3,929,351 | 12/1975 | Fricko | 297/475 |
| 4,113,280 | 9/1978 | Arai et al. | 297/475 |

Primary Examiner—John J. Love
Assistant Examiner—Donn McGiehan
Attorney, Agent, or Firm—Charles E. Leahy

[57] ABSTRACT

A passive occupant restraint system includes a continuous loop restraint belt having an upper end mounted on the vehicle roof rearward and outboard of the seat and a lower end connected to the lower rear corner of the door. A junction ring is slidable along the restraint belt and is attached to one end of a control belt whose other end is mounted inboard the occupant seat by a retractor. The retractor normally retracts the control belt to pull the junction ring adjacent the inboard occupant hip so that the restraint belt is divided into lap and shoulder belt portions positioned across the seated occupant when the door is closed. A track extends longitudinally along the roof rail above the door opening and mounts a belt carriage which slidably receives the shoulder belt. A drive mechanism moves the carriage forwardly when the door opens to stow the shoulder belt portion generally along the roof rail while the lower end of the lap belt is simultaneously moved forwardly and outwardly by the swing geometry the door. The control belt is unwound from the retractor to accommodate the generally outward and forward movement of the lap and shoulder belts to the stowed positions. A catch member is attached to the lap belt portion of the restraint belt and is engageable by the junction ring to limit sliding movement of the junction ring in the direction toward the lower corner of the door so that the opening movement of the door and forward movement of the shoulder belt carriage lift the junction ring and the control belt substantially further upwardly and forwardly away from seated occupant than would otherwise occur.

1 Claim, 2 Drawing Figures

U.S. Patent    Mar. 3, 1981    4,253,681
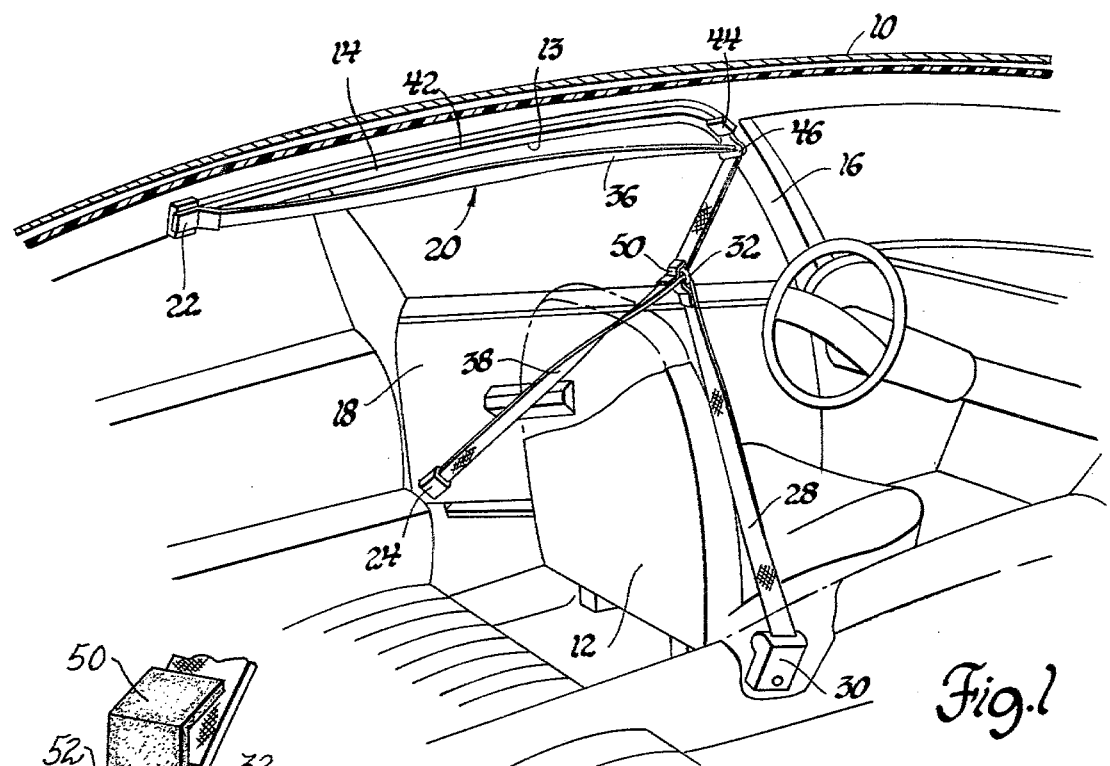
Fig.1
Fig.3
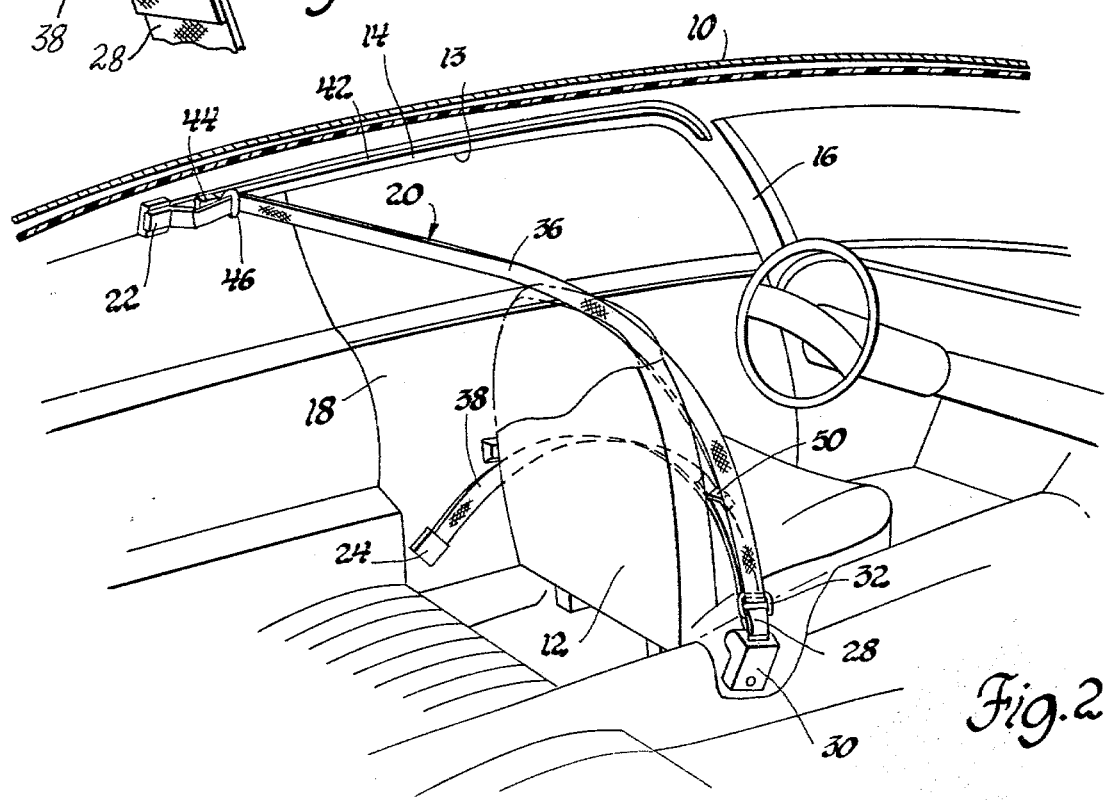
Fig.2

PASSIVE SEAT BELT SYSTEM

The invention relates to a passive occupant restraint belt arrangement for a motor vehicle.

BACKGROUND OF THE INVENTION

It is well known to restrain an occupant in a seat by an automatically deployed shoulder belt extending diagonally across the upper torso and a lap belt extending across the lower torso. U.S. Pat. No. 3,831,974, issued to Charles M. Keppel on Aug. 27, 1974, and assigned the assignee of this invention discloses a continuous loop restraint belt having an upper end mounted on the vehicle roof rearward and outboard of the seat and a lower end connected to the lower rear corner of the door. A junction ring is slidable along the restraint belt and is attached to one end of a control belt whose other end is mounted inboard the occupant seat by a retractor. The retractor normally retracts the control belt to pull the junction ring adjacent the inboard occupant hip so that the restraint belt is divided into lap and shoulder belt portions positioned across the seated occupant when the door is closed. A track extends longitudinally along the roof rail above the door opening and mounts a belt carriage which slidably receives the shoulder belt. A drive mechanism moves the carriage forwardly when the door opens to stow the shoulder belt portion generally along the roof rail while the lower end of the lap belt is simultaneously moved forwardly and outwardly by the swing geometry of the door. The control belt is unwound from the retractor to accommodate the generally outward and forward movement of the lap and shoulder belts to the stowed positions.

SUMMARY OF THE INVENTION

The present invention provides an improvement in the aforedescribed seat belt system. According to the present invention a catch member, preferably in the form of a Z-shaped molded plastic hook, is attached to the lap belt portion of the restraint belt and is engageable by the junction ring to limit sliding movement of the junction ring in the direction toward the lower corner of the door so that the opening movement of the door and forward movement of the shoulder belt carriage lift the junction ring and the control belt substantially further upwardly and forwardly away from seated occupant than occurs in the prior art.

BRIEF DESCRIPTION OF THE DRAWINGS

These and other objects, features and advantages of the invention will become apparent upon consideration of the specification and the appended drawings in which:

FIG. 1 is a perspective view of the vehicle body having the passive occupant restraint of this invention stowed in the occupant access position when the door is open; and FIG. 2 is a view of the vehicle body showing the passive occupant restraint system of the invention in the normal restraining position when the door is closed; and FIG. 3 is an enlarged fragmentary view of FIG. 1.

DESCRIPTION OF THE PREFERRED EMBODIMENT

Referring to FIG. 1, there is shown a vehicle body 10 having a seat 12 located laterally adjacent a door opening 13 defined in part by a longitudinally extending roof rail 14 and an angularly inclined windshield pillar 16. A door 18 is hingedly mounted on the vehicle body 10 for swinging movement between an open position shown in FIG. 1 and a closed position shown in FIG. 2.

A passive occupant restraint system for restraining an occupant in a seat 12 includes a restraint belt 20 having an upper end connected to the roof rail 14 generally above and behind the door opening by an anchorage 22. The lower end of the restraint belt 20 is attached to the lower rear corner of the door by an anchorage 24.

A control belt 28 has an inboard end which is retractably mounted by a control belt retractor 30 suitably mounted on the vehicle body inboard the occupant seating position. The retractor 30 is preferably of the vehicle inertia sensitive type which is locked by a pendulum or other inertia responsive member upon occurrence of predetermined level of vehicle deceleration. A junction ring 32 is attached to the inboard end of the control belt 28 and slidably encircles the restraint belt 20 to divide the restraint belt 20 into a shoulder belt 36 and a lap belt 38.

As best seen in FIG. 1, a track 42 extends longitudinally along the roof rail 14 from the shoulder belt anchorage 22 to the windshield pillar 16. A carriage 44 is movable along the track 42 and has a guide loop 46 which slidably receives the shoulder belt 36.

A suitable drive mechanism is associated with the track 42 and the carriage 44 to move the carriage 44 fore and aft along the track. The drive mechanism moves the carriage 44 forward to the position of FIG. 1 when the door is opened and rearward to the position of FIG. 2 when the door is closed.

Referring to FIG. 2, it is seen that when the carriage 44 is established in the rear position and the door is closed, the shoulder belt 36 and the lap belt 38 are disposed in their normal occupant restraining positions by the retractor of control belt 28 to establish the junction ring 32 adjacent the inboard edge of the seat.

Referring to FIG. 1 it will be understood that opening movement of the door causes the lower end of the restraint belt 20 connected to the door by the anchorage 24 to be moved outwardly away from the seat. Simultaneously, forward movement of the belt carriage 44 by the drive mechanism stows the shoulder belt 36 along the roof rail. The simultaneous stowage of the shoulder belt 36 along the roof rail and the outward movement of the lower end of the lap belt 38 causes substantial unwinding of the control belt 28 from the retractor 30.

As best seen in FIG. 1 a catch or hook 50 is attached by sewn threads 52 to the restraint belt 20 on the lap belt portion 38 thereof. The catch 50 is preferably a generally Z-shaped plastic molding having an upwardly and inwardly opening receptacle adapted to capture the junction ring 32. As seen in FIG. 2, the location of the catch 50 on the lap belt 38 is such that there is no interference with the junction ring 32 when the belts assume the normal restraining positions of FIG. 2. However, during the movement of the belts to the stowed position of FIG. 1, the catch 50 engages the junction ring 32 to limit the extent of downward sliding movement of the junction ring 32 along the belt and thereby lift the junction ring 32 and the control belt 28 substantially further upwardly and forwardly away from the seated occupant than would otherwise occur.

While this invention has been disclosed primarily in terms of the specific embodiment showing the drawings, it is not intended to be limited thereto but rather only to the extent set forth in the appended claim.

The embodiments of the invention in which an exclusive property or privilege is claimed are defined as follows:

1. In combination with a vehicle body having an occupant compartment in which an occupant seat is accessible through a door opening selectively opened and closed by a movable door, a passive occupant restraint system comprising:

a fixed length restraint belt having an upper outboard end mounted on the vehicle body generally adjacent the occupant shoulder and a lower outboard end mounted on the lower rear corner of the door;

a junction ring slidably encircling the restraint belt and dividing the belt into a lap belt portion and a shoulder belt portion;

a control belt having an outboard end attached to the junction ring and an inboard end;

a control belt retractor mounted on the vehicle body inboard the occupant for retracting and extending the control belt;

a track mounted on the vehicle body and extending longitudinally forward from the outboard shoulder belt end;

a carriage slidably receiving the shoulder belt portion of the restraint belt and being movable along the track between a rearward position disposing the lap belt portion and shoulder belt portion in restraining positions adjacent the occupant and a forward position disposing the shoulder belt portion forwardly of the occupant and lifting the lap belt portion upwardly and outwardly as permitted by extension of the control belt from the control belt retractor;

and a catch element fixedly attached to the restraint belt lap belt portion at a point thereon always spaced from the junction ring when the lap and shoulder belts are in restraining position, whereby the catch element is engaged by and limits downward sliding movement of the junction ring upon upward and outward movement of the lap belt portion during forward movement of the carriage and lifts the junction ring and the control belt substantially upwardly and forwardly away from the seated occupant.

* * * * *